United States Patent [19]
Ozretich

[11] 3,719,465
[45] March 6, 1973

[54] COMPOSITION AND METHOD FOR CONTROLLING UNDESIRABLE PLANT GROWTH

[75] Inventor: Thomas M. Ozretich, Midland, Mich.

[73] Assignee: The Dow Chemical Company, Midland, Mich.

[22] Filed: Aug. 6, 1970

[21] Appl. No.: 61,847

[52] U.S. Cl. ........................................71/88
[51] Int. Cl. ........................................A01n 9/28
[58] Field of Search ....................71/88; 260/348

[56] References Cited

UNITED STATES PATENTS

| | | | |
|---|---|---|---|
| 3,183,074 | 5/1965 | Walworth et al. | 71/88 |
| 3,166,398 | 1/1965 | Walworth et al. | 71/88 |
| 2,993,058 | 7/1961 | Hudson | 260/348 |
| 2,939,872 | 6/1960 | Hudson | 260/348 |

FOREIGN PATENTS OR APPLICATIONS

| | | | |
|---|---|---|---|
| 527,462 | 7/1956 | Canada | 71/88 |
| 1,444,887 | 5/1966 | France | 71/88 |

*Primary Examiner*—Lewis Gotts
*Assistant Examiner*—Catherine L. Mills
*Attorney*—Griswold & Burdick and C. Kenneth Bjork

[57] ABSTRACT

A new composition and method for controlling undesirable plant growth which comprises applying to a plant part a growth-suppressing amount of 2-(phenyl)-2-(2,2,2--trichloroethyl)oxirane of the formula:

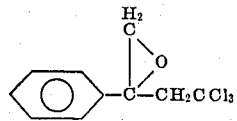

3 Claims, No Drawings

COMPOSITION AND METHOD FOR CONTROLLING UNDESIRABLE PLANT GROWTH

SUMMARY OF THE INVENTION

According to the present invention, it has been discovered that the growth characteristics of many undesirable plants can be controlled and suppressed by exposing plant parts to a composition containing a growth-suppressing amount of 2-(phenyl)-2-(2,2,2-trichloroethyl)oxirane of the formula:

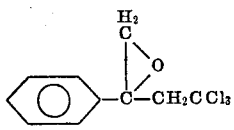

For sake of convenience, the above compound will hereinafter be referred to as the 'oxirane' compound.

In particular it has been found that undesirable plants are killed and controlled by the method of the present invention wherein plant parts, e.g., seeds or other reproductive units, such as root structures, are exposed, either by direct contact or by application to their habitats of a composition containing a growth-suppressing amount of the oxirane compound. What constitutes a growth-suppressing amount of the oxirane compound is dependent upon the plant species and the stage of growth thereof as well as the plant part to be exposed to the oxirane compound. Other factors, such as, for example, the weather conditions of temperature and moisture, the weathering action of sun and rain, and possibly the decomposition of the oxirane compound by the action of bacterial and other soil organisms which eventually frees the growth media of the compound must also be considered.

When large dosages are dispersed in growth media, e.g., soil, a persistent inhibition of the growth of seeds and emerging seedlings of many plant species is obtained. Soil applications of more dilute dosages of the oxirane compound suppress the growth of the germinant seeds and seedlings of many small-seeded grasses while having little or no effect upon the seeds, emerging seedlings or established plants of certain broadleaf crop plants and other crop grasses. Thus the oxirane compound can be employed for the selective control of the growth of the seeds and seedlings of small-seeded grasses in a wide variety of desirable broadleaf crop plants, e.g., soybeans, beans and cotton.

The application to a plant part of a growth-suppressing amount of the oxirane compound is essential and critical for the practice of the present invention. The exact dosage to be supplied in a given operation is dependent upon the plan species and the stage of growth thereof as well as the plant part to be exposed to the oxirane compound. To illustrate, in non-selective pre-emergence herbicidal applications to soil, good results are obtained when the oxirane compound is distributed at a rate of from about 0.5 to about 50.0 pounds or more per acre and through a cross-section of the soil as to provide for the presence therein of an effective concentration of the oxirane compound. In such applications to soil, it is desirable that the compound be distributed to a depth of at least 0.5 inch and at a substantially uniform dosage of at least 0.25 pound per acre inch of soil.

In selective applications to growth media for the control of the germinant seeds and seedlings of many undesirable weeds, and especially those of small-seeded grasses in areas planted with the seeds of desired broadleaf plants or supporting the growth of such plants, a dosage of from about 0.5 to about 10 pounds of the oxirane compound per acre has been found satisfactory. Depending on species response, heavier applications often give good selective weed control. In all selective applications, the exact dosage to be employed is dependent upon the resistance of the broadleaf crop plants or their seeds to the particular oxirane compound employed, and related factors.

The method of the present invention can be carried out be applying an unmodified compound to a plant part. However, the present method also embraces the employment of a liquid or dust composition containing the oxirane compound. In such usage the compound can be modified with one or a plurality of carriers such as water, petroleum distillates or other liquid carriers; and cooperating substances such as surface-active dispersing agents and finely divided solids. Depending upon the concentration of the oxirane compound, such augmented compositions are adapted to be distributed in the soil, or employed as concentrates and subsequently diluted with an additional carrier for the herbicide to produce the ultimate treating compositions.

Compositions comprising the oxirane compound and carrier, with or without other cooperating substances, facilitate the practice of the present invention, and there is obtained a result which is much improved over the result obtained when unmodified oxirane compound is employed in the practice of the present invention. More particularly, the utilization of a liquid or solid carrier permits the growth-suppressing amount of the oxirane compound to be mixed in such quantity of ultimate treating material that adequate coverage of all plant parts or adequate admixture in growth medium can be obtained and thereby the desired growth-suppressing benefits of the present invention completely achieved. Some of these improved results of the utilization of carrier material are obtained when employing the carrier in relatively small, but effective amounts. Generally, however, the improvement is best obtained by employing either a surface-active dispersing agent, in an amount sufficient to emulsify the oxirane compound with water as a carrier, for example, an amount which represents from 0.1 to 15 percent, by weight, of the total treating material; or a finely divided carrier solid, in an amount which represents from 40 to 99.5 percent, by weight, of the total treating material.

The exact concentration of the oxirane compound to be employed in compositions for application to the plant parts or growth media is not critical and can vary considerably provided the required dosage of effective agent is supplied on the plant part or growth media treated. The concentration of the oxirane compound in liquid compositions employed to supply the desired dosage generally is from about 0.0001 to about 50 percent by weight, although concentrations as high as 90 percent by weight are sometimes conveniently employed. In finely divided solid carrier compositions, the concentration of the oxirane compound can be from 0.1 to 50 percent by weight. In compositions to be employed as concentrates, the oxirane compound can be present in a concentration of from 5 to 98 percent by weight.

The quantity of treating composition to be applied can vary considerably provided that the required dosage of active ingredient is applied in sufficient of the finished composition to facilitate the penetration and distribution of the active agent in growth media. The required amount of the active agent conveniently can be supplied per acre treated in from 10 to 27,000 gallons or more of the liquid carrier or in from 10 to 2,000 pounds of the finely divided solid carrier.

Liquid compositions containing the desired amount of active ingredient can be prepared by dissolving the oxirane compound in an organic liquid carrier or by dispersing the oxirane compound in water with or without the aid of a suitable surface-active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the organic liquid carriers, the petroleum distillates are generally preferred. The aqueous compositions can contain one or more water immiscible solvents for the oxirane compound. In such compositions, the carrier comprises an aqueous emulsion, i.e., a mixture of water, emulsifying agent and water immiscible solvent. the choice of dispersing and emulsifying agent and the amount thereof employed is dictated by the nature of the composition and by the ability of the agent to facilitate the dispersion of the oxirane compound in the carrier to produce the desired composition. Dispersing and emulsifying agents which can be employed in the compositions include the condensation products of alkylene oxides with phenols and organic acids, alkyl aryl sulfonates, polyoxy-alkylene derivatives of sorbitan esters, complex ether alcohols, mahogany soaps, and the like.

In the preparation of dust compositions, the active ingredient is dispersed in and on a finely divided solid carrier such as clay, talc, chalk, gypsum, bentonite, fuller's earth, attapulgite, and the like. In such operation, the finely divided carrier is mechanically mixed or ground with the oxirane compound. Depending upon the proportion of ingredients, these dust compositions can be employed as concentrates and subsequently diluted with additional solid carrier or with liquid or solid surface-active dispersing agent to obtain the desired amount of active ingredient in a composition adapted to be employed for the suppression of the growth of the plants. Also, such dust compositions can be dispersed in water, preferably with the aid of a surface-active dispersing agent, to form spray mixtures.

Satisfactory results are obtained when the oxirane compound or a composition comprising the oxirane compound, is combined with other agricultural materials intended to be applied to plant parts or their habitats. Such materials include fertilizers, fungicides, insecticides, soil conditioning agents, and the like.

When operating in accordance with the present invention, a growth-suppressing amount of the oxirane compound is applied to a plant part in any convenient fashion. Applications to a growth medium can be carried out by simply mixing with the medium, such as by applying to the surface of soil and thereafter dragging or discing into the soil to the desired depth or by employing a liquid carrier to accomplish the penetration an impregnation. The application of spray and dust compositions to the surface of soil can be carried out by conventional methods, e.g., power dusters, boom and hand sprayers and spray dusters.

In a further method, the distribution of the oxirane compound in soil can be accomplished by introducing the agent in the water employed to irrigate the soil. In such procedures, the amount of water can be varied with the porosity and water holding capacity of the soil to obtain a desired depth of distribution of the agent.

Other components of the habitat of a plant can be employed in the transfer of the agent of the present invention to a plant or plant part.

In addition, the present method also comprehends the employment of an aerosol composition containing the oxirane compound as an active compound. Such a composition is prepared according to conventional methods wherein the active ingredient is dispersed in a solvent, and the resultant dispersion mixed with a propellant in liquid state. Such variables as the particular active ingredient to be used and the particular plant part to be treated will determine the identity of the solvent and the concentration of the active ingredient therein. Examples of suitable solvents are water, acetone, isopropanol, and 2-ethoxyethanol. Also, employment of the oxirane compound in pastes, gels, foams, invert emulsions, and the like, as well as pigmented or unpigmented pelleted solids is comprehended.

The following examples further illustrate the present invention.

EXAMPLE 1

An aqueous composition containing 2-(phenyl)-2-(2,2,2-trichloroethyl)oxirane is prepared as follows:

Four parts by weight of the compound, 0.08 part of sorbitan trioleate (Span 85), and 0.02 part of a sorbitan monooleate polyoxyethylene derivative (Tween 80) are dispersed in 40 milliliters of acetone to produce a concentrate composition in the form of a water-dispersible liquid containing 2-(phenyl)-2-(2,2,2-trichloroethyl)oxirane as the sole active agent.

A portion of this concentrate composition is separately dispersed in a portion of water to provide an aqueous composition containing 0.44 pound of the oxirane compound per 100 gallons of ultimate aqueous mixture.

The aqueous composition was then employed for the treatment of seed beds of good agricultural soil which had been prepared and seeded with the seeds of various grass species and broadleaf plants. The grass species included white winter wheat, cultured rice, pigweeds, crabgrass, wild oats, Johnson grass, barnyard grass and yellow foxtail; and the broadleaf plants including pinto beans, soybeans, cotton and corn. In the treating operations, a predetermined quantity of the composition was applied to a seedbed as a soil drench at a rate of about 0.43 acre inch of aqueous composition per acre. The quantities were controlled to supply a substantial uniform dosage in a seedbed equivalent to 0.5, 1.0, 2.0 and 5.0 pounds of the oxirane compound per acre. These dosages correspond, respectively, to a concentration, within the soil depth penetrated of about 0.8, 1.6, 3.2 and 8.0 parts by weight of the oxirane compound per million parts by weight of soil. Other seedbeds were similarly seeded with the named plant species but were left untreated to serve as checks.

After about 2 weeks the seedbeds were examined to ascertain what control of the growth of seeds had been obtained. The results are set forth in the following table.

| Seed Species | Percent suppression of Growth of Seeds at the Various Indicated Concentrations of Active Agent in the Treated Seedbed | | | |
|---|---|---|---|---|
| | Lbs./Acre | | | |
| | 0.5 | 1.0 | 2.0 | 5.0 |
| 1. Pigweeds | 30 | 90 | 95 | 95 |
| 2. Crabgrass | 40 | 100 | 100 | 100 |
| 3. Johnson Grass | 90 | 95 | 95 | 100 |
| 4. Barnyard Grass | 50 | 90 | 95 | 95 |
| 5. Yellow Foxtail | 30 | 30 | 100 | 100 |
| 6. White Winter Wheat | 90 | 100 | 100 | 100 |
| 7. Cultured Rice | 100 | 100 | 100 | 100 |
| 8. Wild Oats | 0 | 56 | 95 | 100 |
| 9. Pinto Beans | 0 | 0 | 0 | 50 |
| 10. Soybeans | 0 | 0 | 30 | 30 |
| 11. Cotton | 0 | 0 | 0 | 0 |
| 12. Corn | 0 | 90 | 95 | 95 |

At the time of the observations, the check areas showed populous and vigorous growing stands of the named plant species.

The compound employed in the methods and compositions of the present invention can be prepared in accordance with the procedure described in Canadian Pat. No. 527,462.

I claim:

1. Method useful for controlling undesirable plant growth which comprises applying to plants and/or their habitats a composition containing a plant growth-suppressing amount of 2-(phenyl)-2-(2,2,2-trichloroethyl)oxirane corresponding to the formula

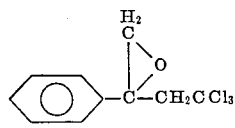

2. The method of claim 1 wherein the composition is applied at a dosage of at least 0.5 pounds of said 2-(phenyl)- -2-(2,2,2-trichloroethyl)oxirane per acre.

3. The method of claim 1 wherein the composition is applied at a dosage of from about 0.5 to about 5.0 pounds of said 2-(phenyl)-2-(2,2,2-trichloroethyl)oxirane per acre.

* * * * *